United States Patent [19]

Majumdar

[11] Patent Number: 4,503,022

[45] Date of Patent: Mar. 5, 1985

[54] PROCESS FOR OXIDATION OF WET PROCESS PHOSPHORIC ACID

[75] Inventor: Kalyan K. Majumdar, Lakeland, Fla.

[73] Assignee: International Minerals & Chemical Corp., Terre Haute, Ind.

[21] Appl. No.: 410,199

[22] Filed: Aug. 23, 1982

[51] Int. Cl.³ .............................................. C01B 25/16
[52] U.S. Cl. ..................... 423/321 R; 423/6; 423/8; 423/321 S
[58] Field of Search ................ 423/6, 8, 321 R, 321 S

[56] References Cited

U.S. PATENT DOCUMENTS

| | | | |
|---|---|---|---|
| 3,711,591 | 1/1973 | Hurst et al. | 423/10 |
| 4,256,570 | 11/1981 | Allen et al. | 423/321 R |
| 4,299,805 | 11/1981 | Wells | 423/321 |
| 4,302,427 | 11/1981 | Berry et al. | 423/10 |
| 4,330,516 | 5/1982 | Winand | 423/321 S |
| 4,402,920 | 9/1983 | Lopez et al. | 423/321 R |

FOREIGN PATENT DOCUMENTS

| | | | |
|---|---|---|---|
| 0027607 | 4/1981 | European Pat. Off. | 423/321 R |
| 2813755 | 10/1979 | Fed. Rep. of Germany | 423/321 R |

OTHER PUBLICATIONS

Carbon Absorption Handbook, Ann Arbor Science, Ann Arbor, Michigan, Chapter 17, "Feasibility of Munitions Wastewater Treatment by Adsorption-Oxidation", K. K. Jain and A. J. Bryce.

Catalytic Oxidation of Ferrous Ion in Acid Mind Water by Activated Carbon, E. A. Mihok, Bureau of Mines Report of Investigations 7337.

Recovering Uranium From Wet Process Phosphoric Acid, F. J. Hurst et al., Chem. Eng., Jan. 1, 1977, pp. 56–57.

*Primary Examiner*—Gregory A. Heller
*Attorney, Agent, or Firm*—Robert H. Dewey

[57] ABSTRACT

A method for oxidation of reduced cations and humate constituents of filtered, wet process phosphoric acid comprising the step of treating the acid with an oxygen source in the presence of activated carbon.

8 Claims, No Drawings

PROCESS FOR OXIDATION OF WET PROCESS PHOSPHORIC ACID

This invention relates to a process for recovering uranium from wet process phosphoric acid. In a particular aspect, this invention relates to an improvement in the step for removing humates and oxidizing ferrous ion present in the phosphoric acid.

Phosphate rock deposits often contain small amounts of uranium. For example, the phosphate rock mined in central Florida for fertilizer use contains about 140–180 ppm by weight of uranium. When the rock is digested with a mineral acid (usually sulfuric acid, but not necessarily) to produce phosphoric acid (known as wet process phosphoric acid) the uranium is dissolved and passes into the acid phase. A process for recovery of this uranium by solvent extraction was taught by F. J. Hurst and D. J. Crouse in U.S. Pat. No. 3,711,591; W. W. Berry and A. V. Henrickson, U.S. Pat. No. 4,302,427 have given a detailed description of an improved version of the process. These patents are incorporated herein by reference thereto.

The phosphoric acid resulting from acidulating phosphate rock with sulfuric acid is usually filtered to remove insolubles such as gypsum, silica and other impurities. The filtered acid is very dark, usually described as brown or black acid. The color is due largely to carbonaceous material present in the rock. The original carbonaceous material is converted by the sulfuric acid to humic acid and related organic compounds generally referred to as humates. The brown phosphoric acid also contains many metallic impurities, such as iron, as well as uranium. The presence of humates causes difficulties in the uranium extraction process, because they cause the formation of stable emulsions with the organic solvents used in the uranium extraction process. The build up of the emulsion products forms a "crud" which collects at the organic-aqueous interface and which eventually fouls the system. The iron content of the brown phosphoric acid is, however, advantageous, for it is employed to indicate the oxidation-reduction state of the uranium content.

It is known to use activated carbon to remove organic contaminants. For example, Wells in U.S. Pat. No. 4,299,805 discusses the prior art and problems arising from the short life of the carbon. Wells discloses a process for regeneration of activated carbon which has been quite successful. However, activated carbon is a high-cost item which eventually must be replaced and the steps of regeneration add to the costs of the overall process. Accordingly, there is a continuing need for improvements in the use of activated carbon.

The acid which has been treated with activated carbon is now green in color, due to dissolved iron and other metallic ions. According to the previous processes, this acid is treated with an oxidizing agent to convert all uranium ions to the +6 level, and also to convert the ferrous ions to ferric. Hydrogen peroxide is commonly used for this purpose, although other oxidizing agents, such as sodium chlorate or nitric acid, have also been used. Simply bubbling air through the green acid will oxidize the uranium ions, but the oxidation rate is very slow, requiring many hours to accomplish the desired degree of oxidation. It is essential that substantially all iron present be oxidized to the ferric state because ferrous ion reduces hexavalent uranium. Hence, unless ferrous ions has been oxidized to ferric, the oxidation of tetravalent uranium ($U_3O_4$) to hexavalent uranium ($U^{+6}$) is incomplete and the $U^{+4}$ will not be extracted. A level of 0.05 g/l of ferrous ion is acceptable. These steps are generally known as pre-treatment steps.

Accordingly, there is a need for an improved process for the oxidation step to eliminate costly oxidizing agents without reducing the production capacity.

SUMMARY OF THE INVENTION

It is an object of this invention to provide an improved process for recovery of uranium from wet process phosphoric acid.

It is another object of this invention to provide an improvement in the pre-treatment of brown phosphoric acid.

Other objects of this invention will be apparent to those skilled in the art from the disclosure herein.

It is the discovery of this invention to provide an improvement in the pre-treatment of brown wet process phosphoric acid used in the recovery of uranium. According to the invention, filtered brown acid resulting from the acidulation of phosphate rock, is catalytically oxidized in the presence of activated carbon. Conducting the oxidation step in the presence of activated carbon makes it possible to use inexpensive oxidizing agents, lengthens the time between carbon regeneration steps and greatly prolongs the life of the carbon.

DETAILED DISCUSSION

According to the improved process of this invention, oxygen from an oxygen source is dispersed in the filtered brown acid at or shortly before the acid enters the activated carbon bed, e.g. a carbon-packed column. The acid at this point is at a temperature of about 120° F., which temperature is suitable for the practice of the invention. Suitable oxygen sources include compressed air, oxygen itself or ozone. Oxygen itself is preferred to air because the nitrogen content of air is inert and tends to cause undesirable foaming in the carbon bed. Antifoam agents cannot be used because they interfere in the uranium extraction. Oxygen, when properly monitored, is nearly entirely consumed and there is no problem of foaming. The remainder of the process will be described as if oxygen is the oxygen source, but those skilled in the art will be able to adapt the process to air or ozone without undue difficulty.

The term oxygen itself is intended to mean compressed, commercial grade oxygen which is generally available at more than 98% purity. High purity oxygen is not required for the practice of this invention.

The oxygen is injected into the acid line by any suitable means. Preferably it is injected inside and at the middle of the acid line at an angle of about 30°. It can be injected by means of a simple T connection, but there is a risk of the oxygen traveling backwards toward the filter. The preferred method of injecting oxygen avoids this possibility. Also, preferably, in start-up, the acid flow is started first, then the oxygen flow is started. In shutdown, the oxygen is stopped first, then the acid flow.

A static mixer capable of dispersing the oxygen to bubbles of about 1000μ, preferably about 260μ, is mounted between the oxygen injection means and the entry to the carbon bed, thus insuring thorough mixing of the gas with the acid. The rate of reaction is inversely proportional to the bubble size, so it is advantageous to minimize the bubble size as much as practical.

The amount of oxygen to be injected depends on the concentration of metal ions in the reduced state, primarily ferrous ion but also uranium, vanadium, etc., and the amount of humates in the feed acid. These substances vary with the phosphate rock, but those skilled in the art are capable of testing for them by known methods. In general, it has been found that the amount of oxygen required varies from about 0.3 to 0.7 grams per gallon of acid. The concentration of $Fe^{+2}$ should be lowered to 0.05 g/l or less.

The following table shows the relationship between ferrous ion present in brown acid and the oxygen required to oxidize it to a maximum of 0.05 g/l.

| Ferrous Ion g/l | Oxygen Required g $O_2$ per Gal. of Acid |
| --- | --- |
| 0.10 | 0.06 |
| 0.20 | 0.15 |
| 0.30 | 0.24 |
| 0.40 | 0.38 |
| 0.50 | 0.50 |
| 0.60 | 0.63 |
| 0.70 | 0.76 |
| 0.75 | 0.84 |

Preferably the oxygen-acid mixture should enter the carbon column as soon after it leaves the mixer as is practical in order to minimize coalescence of bubbles and separation from the acid.

Many advantages have accrued from the invention. Surprisingly, there is no detrimental effect on the activated carbon. Also, surprisingly, the removal of humates is much more efficient with the oxygen-carbon combination than with carbon alone. It has made it possible to operate the carbon column for longer time between regenerations (at least 15% more acid per regeneration), thus significantly increasing the production capacity. Also, surprisingly, oxidation of ferrous to ferric ion continues smoothly even when the carbon surface becomes saturated with humates.

The most significant advantage is savings in costs. Hydrogen peroxide presently costs many times more than oxygen on a weight basis but is only half as effective on a molecular weight basis. Thus, the invention makes it possible to oxidize the ferrous ion at a very large cost advantage.

The invention will be better understood with reference to the following examples. It is understood that these examples are intended only to illustrate the invention and it is not intended that the invention be limited thereby.

EXAMPLE 1

Filtered, brown phosphoric acid was treated with oxygen in the presence of activated carbon. The carbon was contained in six columns connected in series, each of which were 2.5 feet in diameter, 8 feet straight cylindrical height. Each column had a dome with a 5 inch nozzle at each end. The nozzle to nozzle length was 11.5 feet. The columns were loaded with activated carbon with a freeboard of about 40 inches.

An acid line from a clarifier was connected to the first column. An oxygen injector was installed at a 30° angle to the direction of the flow and terminated in approximately the center of the acid line. A static mixer was installed in the acid line between the oxygen injector and the first column. The mixer was capable of dispersing the oxygen into $1000\mu$ bubbles. The acid was fed into the system at a rate of 8.2 gal/minute. The ferrous ion content of the feed acid varied throughout between 0.2 and 0.8 g/l. The rate of oxygen injection was varied according to the ferrous ion content between 0.5 and 3 liters per minute. As can be seen, one run was conducted without oxygen in accordance with the prior process. The color was measured by spectrophotometer at a wavelength of $408 \times 10^{-9}$ meter and reported as color density compared with distilled water as zero. The color of the brown acid feed, the initial color of the product at the beginning of the run and the final color of product at the end of the run were recorded. The ferrous ion concentration of the feed acid varied from 0.2 to 0.8 throughout this experiment. The ferrous ion concentration of the exit acid from run 1 was well above the limit of 0.05 g/l whereas the exit acid from runs 2–5 was below 0.05 g/l. Operating data were as follows:

| Run | Without $O_2$ 1 | With $O_2$ 2 | 3 | 4 | 5 |
| --- | --- | --- | --- | --- | --- |
| Length of Run, hrs | 30 | 29 | 30 | 27 | 30 |
| Total Acid Treated gal | 14,760 | 14,268 | 14,760 | 13,284 | 14,760 |
| Color, Feed, av. | 1.260 | 1.134 | 1.108 | 1.196 | 1.042 |
| Product, initial | 0.139 | 0.163 | 0.150 | 0.141 | 0.209 |
| final | 0.288 | 0.252 | 0.264 | 0.248 | 0.311 |

EXAMPLE 2

The experiment of Example 1 was repeated in all essential details except that the length of the runs was greatly extended before regenerating the carbon. During this experiment the ferrous ion concentration of the feed acid varied from 0.15 to 0.8 g/l.

| Run No. | 6 | 7* | 8* |
| --- | --- | --- | --- |
| Length of Run, hrs | 63 | 82+ | 120.5+ |
| Rate of Acid Feed, gal/min | 8.2 | 8.7 | 9.2 |
| Av. Rate of $O_2$ Injection, l/min | 0.5 | 0.85 | 0.67 |
| Total acid treated, gal | 30,996 | 40,914+ | 62,166+ |
| Color, Feed, Av. | 1.021 | 1.041 | 1.027 |
| Product, initial | 0.151 | 0.256 | 0.357 |
| Product, final | 0.256 | 0.357 | 0.540 |
| Av. $Fe^{+2}$ of exit acid, g/l | 0.017 | 0.011 | 0.016 |

*This was an extension of Run 6
+ Cumulative data

EXAMPLE 3

To a 1 liter beaker equipped with a stirrer there was delivered 700 ml of filtered, brown phosphoric acid obtained by acidulation of phosphate rock with sulfuric acid. Activated carbon 70 g was added (1 g carbon per 100 ml acid) and the mixture was heated to 120° F. with stirring. Oxygen was added through a dispersion tube at 0.17 liters per minute. A similar experiment was conducted using oxygen only without carbon. Samples were taken periodically and analyzed for ferrous ion. The results were plotted on a graph and the following data were read from the curves:

| Time, Min | Ferrous Ion, g/l $O_2$ Only | $O_2$ with Carbon |
| --- | --- | --- |
| 0 | 0.94 | 0.94 |
| 5 | 0.86 | 0.29 |
| 10 | .77 | .16 |

-continued

| Time, Min | Ferrous Ion, g/l | |
|---|---|---|
| | O₂ Only | O₂ with Carbon |
| 20 | .63 | .07 |
| 30 | .46 | .04 |
| 40 | .36 | — |
| 60 | .18 | — |
| 95 | .05 | — |

The $Fe^{+2}$ concentration at 30 minutes is notable: without carbon, it is 10 times the amount with carbon.

EXAMPLE 4

The experiment of Example 3 was repeated in all essential details except that air at 0.8 l min was used as an oxygen source. The data are as follows:

| Time, Min | Ferrous Ion, g/l | |
|---|---|---|
| | Air Only | Air with Carbon |
| 0 | 0.94 | 0.94 |
| 15 | 0.72 | 0.19 |
| 30 | .62 | .11 |
| 45 | .56 | |
| 60 | .53 | .07 |
| 80 | .49 | .048 |

EXAMPLE 5

The experiment of Example 3 was repeated in all essential details except that 3000 ml of acid and 300 g of carbon (1 g carbon per 100 ml acid) were used and the oxygen flow was 0.7 ml/min. In this example, a control without carbon was not included. The results are as follows:

| Time, Min | Ferrous Ion, g/l |
|---|---|
| 0 | 0.700 |
| 10 | 0.374 |
| 20 | 0.222 |
| 30 | 0.117 |
| 40 | 0.047 |

EXAMPLE 6

The experiment of Example 5 was repeated in all essential details except that green acid (which had previously been treated with activated carbon to remove humates) was substituted for brown acid. At the start the ferrous ion concentration was 0.7 g/l; at 14 minutes, it was 0.1 g/l; at 21 minutes, 0.05 g/l, and at 29 minutes, 0.025 g/l.

EXAMPLE 7

The experiment of Example 3 is repeated in all essential details except that ozone is substituted for oxygen on an equivalent weight basis. The ferrous ion content of the brown acid thereby treated is rapidly oxidized and the amount is reduced to an acceptable level.

I claim:

1. A method for oxidation of reduced cations and humate constituents of filtered, wet process phosphoric acid comprising the step of treating the acid with an oxygen source in an amount of about 0.06 to 0.84 g of oxygen per gallon of acid at or shortly before the acid enters an activated carbon bed.

2. The method of claim 1 wherein the temperature of the acid is about 120° F.

3. The method of claim 1 wherein the amount of oxygen used is from about 0.3 g to about 0.7 g per gallon of acid.

4. The method of claim 1 wherein the acid is brown acid.

5. The method of claim 1 wherein the acid is green acid.

6. The method of claim 1 wherein the oxygen source is air.

7. The method of claim 1 wherein the oxygen source is substantially pure oxygen.

8. The method of claim 1 wherein the oxygen source is ozone.

* * * * *

UNITED STATES PATENT AND TRADEMARK OFFICE
CERTIFICATE OF CORRECTION

PATENT NO.   : 4,503,022
DATED        : March 5, 1985
INVENTOR(S)  : Kalyan K. Majumdar It is certified that error appears in the above-identified patent and that said Letters Patent are hereby corrected as shown below:

Column 2, line 1, "($U^{30\ 4}$)" should read -- $U^{+4}$ --

Column 5, line 17, "0.8 1 min" should read -- 0.8 1/min --

*Signed and Sealed this*

*Thirtieth* Day of *July 1985*

[SEAL]

*Attest:*

DONALD J. QUIGG

*Attesting Officer*   *Acting Commissioner of Patents and Trademarks*